(No Model.) 2 Sheets—Sheet 1.

L. P. WARNER.
MACHINE FOR MAKING CARRIAGE TUFTS.

No. 399,225. Patented Mar. 5, 1889.

Witnesses.
Chas. R. Burr
Thomas Durant.

Inventor.
Louis P. Warner
by Church & Church
his Attorneys (No Model.) 2 Sheets—Sheet 2.
L. P. WARNER.
MACHINE FOR MAKING CARRIAGE TUFTS.
No. 399,225. Patented Mar. 5, 1889.
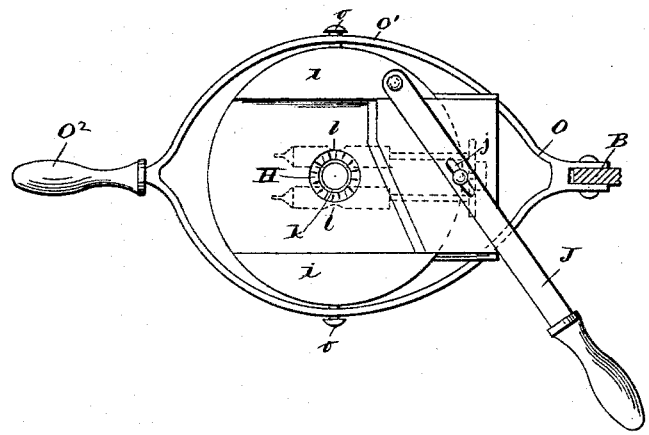
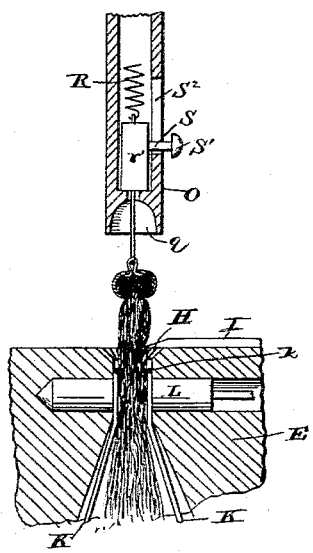
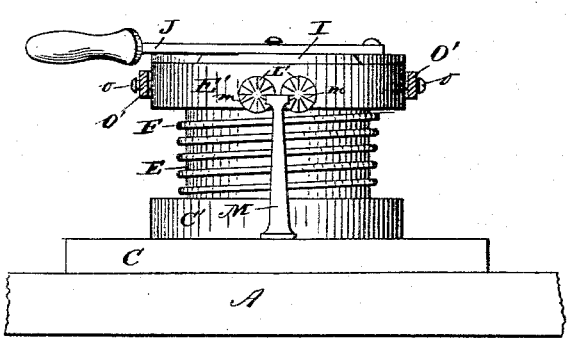
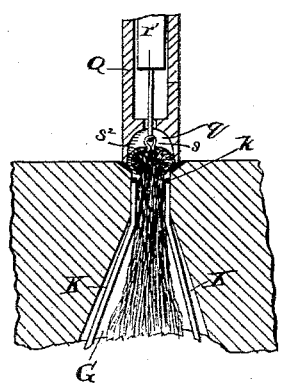
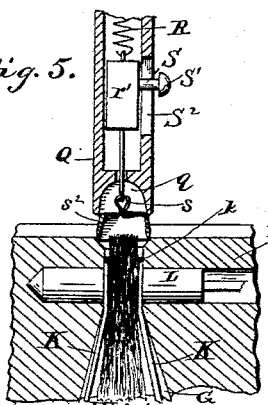
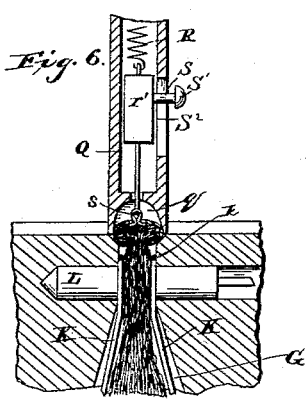
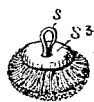
Witnesses.
Chas. R. Burr.
Thomas Durant.
Inventor.
Louis P. Warner,
by Church & Church
his Attorneys.

UNITED STATES PATENT OFFICE.

LOUIS P. WARNER, OF ROCHESTER, NEW YORK.

MACHINE FOR MAKING CARRIAGE-TUFTS.

SPECIFICATION forming part of Letters Patent No. 399,225, dated March 5, 1889.

Application filed July 20, 1888. Serial No. 280,456. (No model.)

*To all whom it may concern:*

Be it known that I, LOUIS P. WARNER, of Rochester, in the county of Monroe and State of New York, have invented a certain new and Improved Machine for Making Carriage Tufts or Buttons; and I do hereby declare the following to be a full, clear, and exact description of the same, reference being had to the accompanying drawings, forming a part of this specification, and to the figures and letters of reference marked thereon.

My present invention has for its object to provide a machine for making the tufts used in the padded insides of carriages or other cushions, or for making buttons in which the shank is clamped around the material; and it consists in certain improved constructions and combinations of the parts, all as hereinafter fully described, the main features being pointed out in the claims at the end of this specification.

Figure 1:
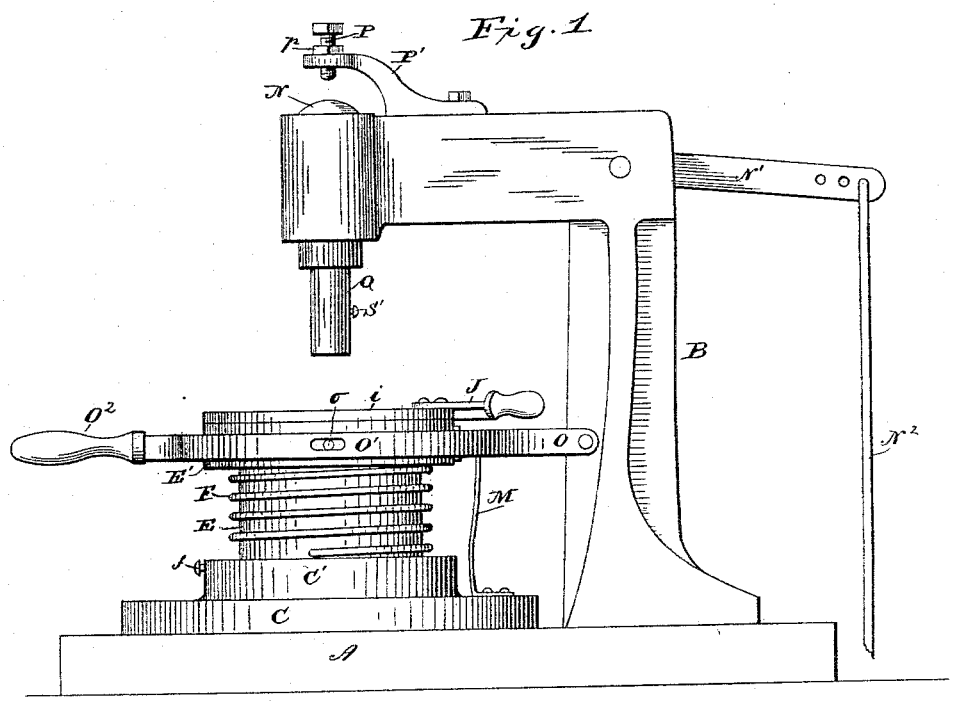
Figure 2:
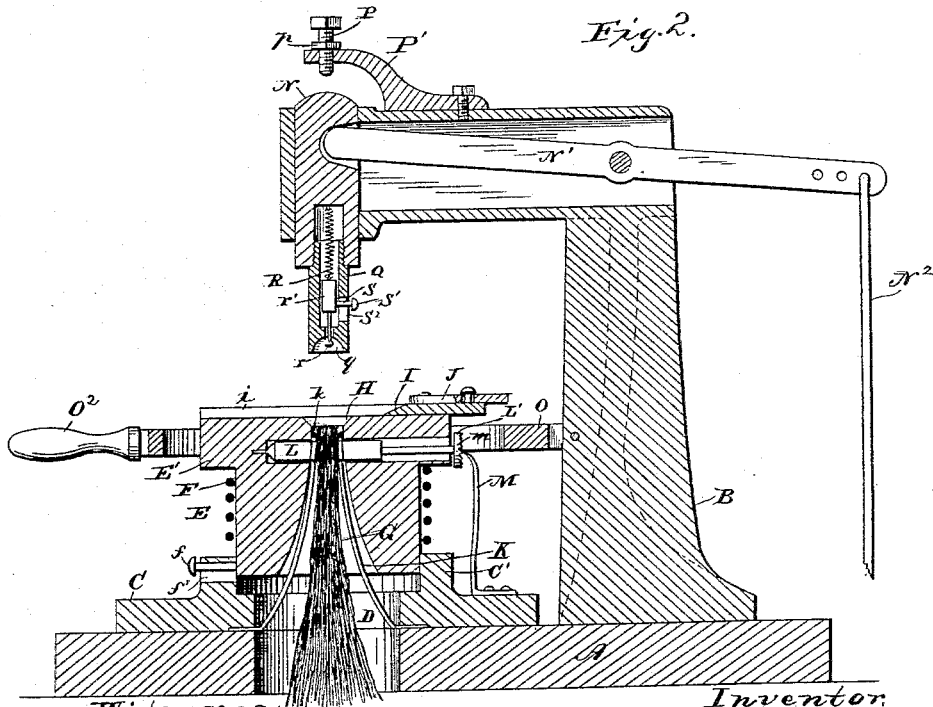

In the drawings, Figure 1 is a side elevation of a machine constructed in accordance with my invention. Fig. 2 is a longitudinal sectional view of the same; Fig. 3, a top plan view of the lower anvil; Fig. 4, a side view of the same; Figs. 5, 6, and 7, views of various steps in the operation of the machine; Fig. 8, a view of a modification; Fig. 9, a view of the back; Fig. 10, a view of one of the completed tufts or buttons.

Similar letters of reference in the several figures denote similar parts.

A represents a base or table, on which the standard of the machine B is secured in any suitable manner, and formed upon, or preferably attached to, the table, or to a forwardly-extending portion of the standard, is a casting, C, with an upwardly-extending annular flange or ring, C', thereon, and a central perforation or recess, D, therein, a corresponding recess being formed below in the table or support, up through which the material for forming the tuft passes.

E is a tubular anvil or casting, provided at the lower end with a portion fitting within and guided in its movements by the flange C', and above this with an outwardly-extending flange or shoulder, E', between which and the flange C' is provided a spiral or other suitable spring, F, operating to hold the anvil raised normally, its motion being limited by a suitable pin or screw, *f*, projecting through a slot, *f'*, in the flange, as shown. The central portion of this anvil is recessed, as shown at G, the lower part being of greater diameter than the upper, forming a taper, and the upper face of the anvil being inclined, as at H, at the sides of the recess, forming a die for compressing the tuft back or socket, as will be described. The edges of this inclined or die portion I preferably corrugate slightly, so that the slight grooves formed at the sides of the back will engage them, and not only prevent slipping, but will start the forcing in of the outer edges of the back at a series of points. These slight grooves in the back, which are made when it is being formed, are clearly shown in Fig. 9.

The upper face of the anvil is perfectly flat, and over it is arranged to slide an inclined cutting-knife, I, suitable guides, *ii*, being arranged at the side for confining its edges, and a lever, J, provided with a slot, *j*, in which a pin, *j'*, on the knife-blade is adapted to operate, is pivoted, preferably, upon one of these guide-strips. The construction is such that when the lever is moved by its handle the knife will slide across the opening in the face of the anvil and sever the material projecting above it.

Inside the recess in the anvil is provided a material-guide, K, constructed preferably with a ring or stationary guiding-loop, *k*, at the center, slightly less in diameter than the smallest part of the recess, and the depending supporting-arms attached to the base. This ring is so positioned relative to the other parts described that when the anvil is in the lowest position, with the spring compressed, it will be slightly below the lower edge of the incline H, and when the anvil is raised will stand below it a distance corresponding to the amount of movement permitted the said anvil.

Just below the guide K, when the anvil is raised, are located two feeding-rollers, L L, adapted to rotate in suitable recesses formed in the anvil, and formed with the cut-away portions *l l* at the center, adapted, when in position, to form a space between them to feed the yarn fibers or other material in a substantially round strand, said rolls being arranged to rotate upward at their proximate sides by suitable means at each downward movement of the anvil. In the present construction this is caused by providing the end of the roll-shafts with wheels L' L', in the faces of which are formed ratchet-teeth $m$ $m$, while upon the collar C is secured a pawl, M, its end being bent inward and engaging said wheels on the inner side of the centers, so as to rotate them, as described, a short distance when the anvil is depressed.

O represents a lever pivoted at the forward end to the standard, or any support, provided with arms O' O', passing on opposite sides of the anvil and connected to a handle, O², at the outer rear end, the arms O' O' being provided with perforations, with which pins $o$ $o$ in the anvil sides engage, the whole being so arranged that the downward movement of the handle will cause the anvil to be moved down upon the spring, and upon a release of the handle the spring will return it to normal position.

The upper portion of standard B is arranged to overhang the anvil, and in this is arranged a head or slide, N, provided with a slot therein, in which projects the end of a lever, N', pivoted to the standard, the outer end being connected by a connecting-bar, N², with a treadle or operating-handle arranged beneath, as will be understood, so that by the movements of the latter a reciprocating motion may be given the slide when desired.

A bracket, P', is secured above the end of the slide, through which projects set-screw P, arranged to operate upon the slide and adjust its upward movement, a suitable set-nut, $p$, being provided to secure it in adjusted position. In the lower part of the slide is a tubular plunger, Q, having at its lower end a cup-shaped recess or socket, $q$, and arranged to carry the socket or cap of the tuft to be formed and to co-operate with the anvil and to secure it to the material.

Inside the plunger is arranged a spring, R, secured at its upper end to the slide, and carrying at its lower end a block, $r'$, provided with a small hook, $r$, on a long shank projecting into the recess $q$. This spring normally retracts the block and holds the hook up against the inside of the recess $q$; and in order to project the hook to engage the tuft-shank, I provide in the side of the plunger a slot, S², through which projects a pin, S, secured to the block, carrying a knob, S', by means of which the operator can pull the block down and cause the hook to project a sufficient distance to engage a back eye with it, permitting the spring to return it to normal position within the plunger.

The material or stock of which the tuft is composed, preferably fibers of yarn assembled loosely together, forming a strand, is supplied from a reel or other suitable receptacle located below the table, and its end being cut off straight is passed up through the loop $k$ of holder K and projects slightly above it.

In Fig. 9 is shown one of the sockets or backs forming the base portion of the tuft or button, constructed, preferably, of sheet metal and provided with a loop or eye, $s$, similar to an ordinary button and formed in any manner desired.

Starting with the yarn or tuft material slightly below the level of the top of the anvil, the operator, grasping knob S, pulls the loop $r$ down, so that it projects below the lower end of the plunger and engages it with the eye of the back, and, releasing the knob, the spring R draws it back, holding the back up in recess $q$. Then operating the treadle or handle connected to lever N causes the plunger to descend until the projecting edge of the back strikes the anvil and presses it down against the spring. This downward movement causes the pawl M to operate upon the rollers, feeding the material upward a short distance into the back, the loop $k$ above them keeping it from spreading too soon, and preventing friction between the sides of the perforation face acting on the material to push it down until the lower side of the anvil is arrested, and then the incline H turns the edges of the back inward, as shown in Fig. 6, compressing them around the material and securing the socket firmly to the fiber. Now the plunger is moved upward a distance regulated by the screw P, against which it strikes, the spring permitting the block to come down and engage with the bottom of the recess, pulling the back and the material with it. This operation not only tests the fastening of the back, but also feeds the material. The handle O is then operated to move the anvil down, and while down the cutting-blade is moved across the face, severing the material. This downward movement, if the rollers are employed, feeds the material upward, as before, (and if desired to obviate this the anvil could be held down by its handle,) when the back is clinched, the plunger raised, and the material severed without moving the anvil twice. As the feeding-rollers have a grip on the material, they would prevent its being pulled below the level of the top of the anvil when the spring moves the latter up, but would maintain it at the same level relative to the surface of the anvil at which it was severed; and to obviate this the operator grasps the spring-pawl M and pulls it out of engagement with the ratchet-teeth $m$, allowing the friction of the material to turn the rollers backward as the anvil is rising after the tuft is severed. Now the operator moves the knob S' down and removes the tuft formed, places another back on the hook, and repeats the operation, as described. The length of the tuft, it will be seen, is regulated by the movement the stop P permits the plunger to have above the anvil, so that by adjusting the screw tufts of various lengths can be formed.

I prefer in some and perhaps the majority of instances to dispense entirely with the rolls for feeding the material upward, and to locate the guiding-loop a sufficient distance below the inclined portion of the anvil and extend the incline farther below the anvil-top than where the feeding-rollers are employed, so that the back will clear it when moved down to clamp the material, as in Fig. 8. The reason for this lengthening of the incline is that a sufficient grip may be had by the back on the stock, even if it should not be fed upward, as by the rollers. In this event the end of the material is left just above the lower end of the incline in the anvil when in highest position to permit the back in coming down to pass over it. The distance between the guiding-loop and the anvil-face and between the sides of the perforation in the anvil and the inside of the loop being slight, the material will not have an opportunity to spread, nor will the friction on the inside of the perforation be sufficient to disturb the fibers when the anvil moves down, and, further, the back being compressed from the outside will securely clamp all of them.

The employment of a sliding die passing up over the material is advantageous, as the latter is given less opportunity to spread, and the back passes over it before it appears above the top of the anvil, as stated.

In the construction dispensing with the rollers the second downward movement of the anvil by the lever will not effect the feed of the material upward, and for this reason also I prefer it; but when it is desired to feed the material the above devices can be advantageously employed.

It will be understood that the wires of the guiding-loop are quite small and are passed between the rollers, as shown.

While it is designed to operate this machine as described, it is obvious that the tuft-back could be placed over the perforation in the anvil by hand and the plunger simply employed to force it downward to cause its engagement with the material, and being raised by hand the knife could be used to sever it; but this is not desirable.

Any suitable material could be used for the buttons, the back being clamped to it and the feeding accomplished by pulling it through the anvil by the socket and cutting it off, as described.

I claim as my invention—

1. The combination, with a movable plunger and a device for positively securing a tuft-back thereto, of a perforated anvil through which the material passes, and with which the back co-operates to clamp it to the material, whereby upon the retraction of the plunger the material will be pulled through the anvil by the back, substantially as described.

2. The combination, with the movable plunger and device for positively securing a tuft-back thereto, of a perforated co-operating anvil through which the material passes, the edge of the perforation being arranged to compress the edges of the back toward the material, whereby upon the retraction of the plunger the material will be pulled through the anvil by the back.

3. The combination, with the movable plunger, a back-securing device mounted thereon, and an adjustable stop for limiting the movement of the plunger, of a perforated co-operating anvil through which the material passes, the edge of the perforation being arranged to compress the edges of the back toward the material, substantially as described.

4. The combination, with the movable plunger and a device for positively securing a tuft-back thereto, of a perforated co-operating anvil through which the material passes, the edges of the perforation being arranged to compress the edges of the back toward the material, and a cutting-blade adapted to be moved between the plunger and die to sever the material, substantially as described.

5. The combination, with the movable plunger and a back-securing device mounted thereon, and a stop limiting the movement of the plunger, of a perforated co-operating anvil through which the material passes, the edges of the perforation being arranged to compress the edges of the back toward the material, and a cutting-blade adapted to be moved over the top of the anvil to sever the material close to the same, substantially as described.

6. The combination, with the movable plunger, of a perforated co-operating anvil through which the material passes, the edges of the perforation being arranged to compress the socket edges toward the material, a spring for supporting said anvil, and a stationary material-guide inside the anvil, substantially as described.

7. The combination, with the movable plunger, of a perforated co-operating anvil through which the material passes, the edges of the perforation being arranged to compress the back edges toward the material, a spring supporting the anvil, feeding-rollers for the material within the die, and means, substantially as described, for rotating said rollers when the anvil is moved against the spring, as set forth.

8. The combination, with the movable plunger, of a co-operating anvil having a perforation through which the material passes, the edges of the perforation being arranged to compress the socket edges toward the material, a spring supporting the anvil, and feeding-rollers for the material within the anvil, having ratchet-wheels and a pawl to rotate them when the anvil is moved against its spring, substantially as described.

9. The combination, with the movable plunger, of a co-operating anvil having a perforation through which the material passes, the edges of the perforation being arranged to compress the edges of the back toward the material, a spring supporting said anvil, a stationary guide within the anvil, feeding-rollers, also within the anvil, and means, substantially as described, for rotating said rollers and feeding the material when the same is moved against the spring, as set forth.

10. The combination, with the movable plunger, of a co-operating anvil having a perforation through which the material passes, the edges of the perforation tapering toward the material, a spring normally projecting it, and a stop for limiting its movement, substantially as described.

11. The combination, with the movable hollow plunger, the spring thereon, and a back-supporting device secured to the spring, of an anvil having an opening therein, the edge of the opening tapering toward the center, substantially as described.

12. The combination, with the hollow slotted plunger, the spring therein, a back-holding device secured to the spring, and a pin projecting through the slot, of a co-operating anvil having an opening within, with rolls tapering toward the center, substantially as described.

13. The combination, with the plunger, of the co-operating anvil having the perforation for the material, a spring for normally projecting the anvil, and a stop for limiting its motion, of the guides on the anvil and a sliding knife arranged to operate thereon, substantially as described.

14. The combination, with the plunger having the cavity in the end, the hook, and the spring for operating it, of the co-operating anvil having the perforation through which the material passes, the edges of which are tapered toward the center, and the sliding knife operating on the top of the anvil, substantially as described.

15. The combination, with the plunger, the co-operating perforated anvil, a spring for normally projecting the anvil, a stop for limiting its motion, and a handle for moving it against the spring, of a knife arranged to slide over the anvil-face, substantially as described.

16. The combination, with the plunger having the device for the positive attachment of the tuft-back shank thereon, of the perforated anvil through which the material passes, and with which the back co-operates to clamp it to the material, whereby upon the retraction of the plunger the material will be pulled through the anvil, substantially as described.

LOUIS P. WARNER.

Witnesses:
 FRED F. CHURCH,
 HENRY A. SCHAEFER.